(12) United States Patent
Schoeley et al.

(10) Patent No.: US 8,851,328 B2
(45) Date of Patent: Oct. 7, 2014

(54) METHOD FOR METERING COMPOUNDS BASED ON ORGANOPOLYSILOXANES

(75) Inventors: Peter Schoeley, Diera-Zehren (DE); Guenther Dineiger, Meissen (DE); Stephan Schulz, Dresden (DE)

(73) Assignee: Wacker Chemie AG, Munich (DE)

( * ) Notice: Subject to any disclaimer, the term of this patent is extended or adjusted under 35 U.S.C. 154(b) by 554 days.

(21) Appl. No.: 13/264,228

(22) PCT Filed: May 3, 2010

(86) PCT No.: PCT/EP2010/055975
§ 371 (c)(1),
(2), (4) Date: Oct. 13, 2011

(87) PCT Pub. No.: WO2010/130592
PCT Pub. Date: Nov. 18, 2010

(65) Prior Publication Data
US 2012/0031496 A1     Feb. 9, 2012

(30) Foreign Application Priority Data

May 12, 2009  (DE) .......................... 10 2009 003 044

(51) Int. Cl.
*B67B 7/00* (2006.01)
*G01F 11/00* (2006.01)
*B65B 3/30* (2006.01)
*C08L 83/04* (2006.01)

(52) U.S. Cl.
CPC . *B65B 3/30* (2013.01); *C08L 83/04* (2013.01); *Y10S 528/901* (2013.01)
USPC .............................................. 222/1; 528/901

(58) Field of Classification Search
USPC ............... 222/1, 71, 424.5; 528/901
See application file for complete search history.

(56) References Cited

U.S. PATENT DOCUMENTS

| | | | |
|---|---|---|---|
| 6,739,111 B2 | 5/2004 | Banks et al. | |
| 7,798,374 B2 * | 9/2010 | Schoeley et al. | 222/282 |
| 8,497,339 B2 * | 7/2013 | Schoeley et al. | 528/12 |
| 2003/0041565 A1 | 3/2003 | Banks et al. | |
| 2004/0082462 A1 | 4/2004 | Scheim et al. | |
| 2006/0108024 A1 | 5/2006 | Cooper et al. | |
| 2006/0249535 A1 | 11/2006 | Mauger et al. | |
| 2008/0033100 A1 * | 2/2008 | Scholey et al. | 524/506 |
| 2008/0171845 A1 * | 7/2008 | Schoeley et al. | 528/10 |
| 2008/0257447 A1 * | 10/2008 | Mauger et al. | 141/2 |
| 2009/0108024 A1 * | 4/2009 | Stanton et al. | 222/183 |
| 2012/0031496 A1 * | 2/2012 | Schoeley et al. | 137/1 |

FOREIGN PATENT DOCUMENTS

| | | |
|---|---|---|
| CN | 2176968 Y | 9/1994 |
| DE | 3718948 A1 | 12/1988 |
| DE | 202004014083 U1 | 1/2005 |
| DE | 102007002379 A1 | 7/2008 |
| EP | 0512730 B1 | 2/1996 |
| EP | 1397428 B1 | 8/2004 |
| EP | 1884541 B1 | 9/2008 |
| JP | 2006-519143 A | 8/2006 |
| JP | 2008-526625 A | 7/2008 |

OTHER PUBLICATIONS

Noll, Walter: Chemie und Technologie der Silicone [Chemistry and Technology of the Silicones], 2nd edition 1968, Verlag Chemie GmbH, Weinheim/Bergstr., p. 404 (and Abstract).

Lueger, Otto, Lexikon der gesamten Tecnik und ihrer Hilfswissenschaften [Lexicon of complete technology and auxiliary sciences thereof] vol. 5, Stuttgart and Leipzig, Deutsche Verlags-Anstalt, pp. 581-583 (and abstract).

D'Ans, Jean und LAX, Ellen: Taschenbuch fuer Chemiker und Physiker [Handbook for chemists and physicists], 2nd corrected edition 1949, Springer-Verlag, Berlin-Goettingen-Heidelberg, p. 738 (and abstract).

Abstracts for German Literature.

\* cited by examiner

*Primary Examiner* — Kevin P Shaver
*Assistant Examiner* — Benjamin R Shaw
(74) *Attorney, Agent, or Firm* — Brooks Kusman P.C.

(57) ABSTRACT

Viscous compositions are metered discontinuously into storage vessels such as tubes, tubs, or cartridges, from a stable volume container free of dead space wherein the calculated volume, expressed as the mathematical product of adiabatic compressibility coefficients of the composition, the outlet pressure, and volume of the container exceed the metered volume.

15 Claims, No Drawings

METHOD FOR METERING COMPOUNDS BASED ON ORGANOPOLYSILOXANES

CROSS-REFERENCE TO RELATED APPLICATIONS

This application is the U.S. National Phase of PCT Appln. No. PCT/EP2010/055975 filed May 3, 2010 which claims priority to German application DE 10 2009 003 044.1 filed May 12, 2009.

BACKGROUND OF THE INVENTION

1. Field of the Invention

The invention relates to a method for the discontinuous metering of compositions based on organopolysiloxanes, in particular organopolysiloxane compositions crosslinkable at room temperature.

2. Description of the Related Art

Single-component sealing compounds that are storable in the absence of water, and vulcanizing on the ingress of water to form elastomers at room temperature are known. These products are used in great amounts in the building industry, for example. The base for these mixtures are polymers which are terminated by silyl groups and which carry reactive substituents such as OH groups or hydrolyzable groups such as alkoxy groups or acetoxy groups. In addition, these sealing compounds can contain fillers, plasticizers, crosslinkers, catalysts and also additives. Very frequently, highly disperse silicic acids are used as fillers. These are added to the "RTV1" sealing compounds in very small amounts, since in case of larger proportions of the reinforcing fillers, undesirably high tensile stresses are reached even at low strains of the cured material. The production of RTV1 sealing compounds is described, for example, in EP-B1-1 884 541.

Conventionally, the RTV1 sealing compounds, after they have been produced, are packaged in barrels or what are termed fluid bags in which they are first stored. Then they are packaged in ready-to-use packages, such as cartridges, flexible pouches or tubes. Usually, the RTV1 sealing compounds are first expressed from the large-scale package at a certain upstream pressure or removed by suction. Thereafter transporting elements such as screw pumps or gear pumps are used.

The transporting processes are generally technically very demanding, since, in contrast to Newtonian fluids, the firm RTV1 sealing compounds exhibit a completely different rheological behavior. In particular, RTV1 sealing compounds, in addition to their extremely high viscosity, exhibit a flow limit, since they must not flow out of a vertical joint when used, for example, for sealing building joints.

Therefore, at each start of a transporting operation, first the flow limit must be overcome, before the high-viscosity RTV1 sealing compound begins to move in the transporting line.

This means that a considerable amount of power must be introduced into the mixture via the transporting elements. Such a power introduction is highly disadvantageous here, since the high mechanical stress of at least the part of the mixture which is situated in the transporting elements, degrades the structures of the reinforcing fillers. This can even lead to loss of firmness of the RTV1 sealing compound.

The higher the volume that is to be transported, the greater the power input and the mechanical stress of the RTV1 sealing compound in the transporting element at the start of each transporting operation.

Since this mechanical stress in the transporting element relates to only a relatively small part with respect to the total volume that is to be transported and since backmixing processes also take place during the further transporting operation, the product damage can very frequently be tolerated if a relatively long-lasting transporting operation follows.

However, the situation is completely different if the RTV1 sealing compounds are packaged in small packages such as 310 ml cartridges. In this case, the product damage to the RTV1 sealing compound owing to mechanical stress can be dramatic, since the transporting operation is constantly interrupted and must be started again each time for packaging in a cartridge. In particular, the product damage can be very high when the volume of the RTV1 sealing compound in the transporting element is greater than 310 ml. This would mean that some of the sealing compound is actually repeatedly highly mechanically stressed. This is the case, in particular, when, because of intentionally short metering times, metering pumps having a very large metering volume are used.

In another method for metering RTV1 sealing compounds at packaging machines, after metering the desired amount, the metering line is likewise closed. The metering pump, however, remains permanently in operation and transports the RTV1 sealing compound via what is termed an overflow back into the line upstream of the metering pump. The product damage caused thereby is unwanted. However, it is further increased in that, for example, during machine shutdowns, pumped circulation via the overflow is operated over a relatively long period.

In addition, during packaging in small packages, owing to the discontinuous transport, unwanted pressure pulses act on the mechanical equipment of the packaging device. This produces costly leakage losses in the case of hydraulic oils, leaks at transitions from fixed metal tubes to flexible tube lines, a great hazard owing to large gas volumes in pneumatic plants and a high noise level.

In addition, there is the disadvantage that the packaging plants are idle over a relatively long time because the packages from which metering takes place must be changed after they are emptied. These idle times drastically shorten the machine running times.

SUMMARY OF THE INVENTION

The invention relates to a method for metering compositions based on organosilicon compounds from a container which is substantially free of dead space and stable in volume and from which the composition is taken off discontinuously in discrete volumes, characterized in that, before the metering step, the calculated volume as a mathematical product of adiabatic compressibility coefficient of the composition transported, the pressure prevailing in the container at the outlet and the volume of the container is greater than the volume of composition taken off in the metering step.

DETAILED DESCRIPTION OF THE PREFERRED EMBODIMENTS

The compositions of the invention are preferably crosslinkable compositions based on organosiloxanes, most preferably compositions crosslinkable at room temperature by condensation reaction, which are termed RTV1 compositions, and which cure on the ingress of atmospheric humidity. These are preferably prepared using siloxanes having condensable groups, crosslinkers, catalysts and, optionally, other substances. Starting materials and methods for preparation of such compositions are already widely known. In this context, reference may be made, for example, to EP-B-512 730 and EP-B-1 397 428, which are incorporated herein as part of the disclosure of the present invention.

Thus, the mixtures can be prepared according to their formula in any desired plants, preferably continuously operating plants, such as using twin-screw extruders, reciprocating-screw kneaders or mixing aggregates with a rotor/stator system.

The compositions which are metered according to the invention preferably consist predominantly of organosiloxanes, the compositions most preferably containing organosiloxanes in amounts of 50 to 99% by weight, in particular 60 to 95% by weight.

Preferably, in the inventive method, the compositions, after preparation thereof, before they are introduced into the container from which they are metered, are devolatalized and degassed using machines that are known per se such as, for example, twin-screw extruders, twin-shaft kneaders, or reciprocating-screw kneaders. This makes possible problem-free transport of the composition and already provides the necessary bubble-free packaging into the moisture-tight package.

Compositions that are to be metered in the method according to the invention are preferably highly viscous, having viscosities preferably greater than 10 Pa·s, more preferably from 100 to 200,000 Pa·s, in each case measured at 25° C. and a shear rate of $1.0 \, s^{-1}$, and are preferably firm, e.g. do not run out of vertically suspended aluminum profiles, as specified in ISO 7390.

The density of the compositions to be metered according to the invention is preferably 0.9 to 1.8 g/cm$^3$ at 25° C. and 1013 hPa.

In a preferred embodiment of the invention, RTV1 sealing compounds based on high-viscosity crosslinkable polydimethylsiloxanes are used.

In the context of the method of the invention, the compressibility coefficient is taken to mean the coefficient which the transported composition has under the conditions prevailing at the outlet.

Compressibility coefficients and determination thereof are generally known. In this context reference may be made, e.g., to Noll, Walter: Chemie und Technologie der Silicone [Chemistry and Technology of Silicones], 2nd edition 1968, Verlag Chemie GmbH, Weinheim/Bergstr., page 404; Lueger, Otto: Lexikon der gesamten Technik und ihrer Hilfswissenschaften [Lexicon of Complete Technology and Auxiliary Sciences thereof], volume 5, Stuttgart and Leipzig, Deutsche Verlags-Anstalt, pages 581-583; and D'Ans, Jean and Lax, Ellen: Taschenbuch für Chemiker und Physiker [Handbook for Chemists and Physicists], 2nd corrected edition 1949, Springer-Verlag, Berlin-Gottingen-Heidelberg, page 738. The compressibility coefficient of the finished composition can be determined or else the compressibility coefficients of the individual components corresponding to their proportion of the total volume of the respective composition. The compressibility coefficient of the composition which is to be metered firstly depends on the type and proportion of the organopolysiloxanes used. The other mixture components which are optionally used, such as adhesion promoters, catalysts, crosslinkers, and especially fillers, such as highly disperse silicon dioxide and calcium carbonates, or fungicides and color pigments, are generally considered to be not compressible or only very minimally compressible, and have only a minor influence. In contrast, it is expedient to take organic plasticizers into account, especially when the proportion of these materials in the sealing compound is, for example, greater than 1.0% by volume.

The container used in the method of the invention from which the composition is metered is preferably mechanically stable and also sealed air- and moisture-tightly. The embodiment according to the invention of the container in a mechanically stable form of construction means that materials such as steel or aluminum are preferred. Stiffenings, for example made of concrete, are also possible. The purpose of the mechanically stable embodiment is, in particular, the exclusion of atmospheric humidity, since penetrating atmospheric humidity would cause product damage and high resistance to deformation of the container.

The container used according to the invention is stable in volume under the prevailing pressures and temperatures. Stable in volume in the context of the invention means that the volume increase thereof by applying the working pressure is a maximum of 9% of the discrete transported volume. In addition, stable in volume means that the thermal expansion of the container changes only in the long term over a plurality of minutes or hours, and therefore cannot be used to affect the pressure in the container for implementing continuously repeating metering operations.

The container used according to the invention can have any desired geometric shape. Preference is given to spherical or cylindrical shapes, with particular preference given to cylindrical shapes. The cross sections can be rectangular, round or oval. Particular preference is given to circular cross sections.

Furthermore, internal dimensions of the container are preferred which ensure a large surface to storage volume ratio. That is to say the container should, in the case of a cylindrical shape, for example, be very long and thin. Preferably, the quotient of length and diameter of the container used according to the invention has values from 1 to 10,000, more preferably from 1 to 1000. It can be advantageous here if the cylindrical container has bends. This is expedient, for example, when a continuously operating plant for preparing the crosslinkable composition and a plant for packaging the composition into small packages are constructed in adjacent locations.

The preferred use of pipes of low diameter as container ensures a type of plug flow, as a result of which the median residence time of the composition in the container is short.

The container can also consist of a plurality of components which can be prefabricated and assembled as desired, e.g. by bolting or welding. The seals between these two components should preferably be selected in such a manner that they withstand the thermal and chemical loads, that is to say that they are in particular resistant to the constituents of the compositions used.

In the case of the method according to the invention, the internal pressure of the container that is substantially free of dead space is permanently at least 5000 hPa, preferably at least 10,000 hPa, and most preferably 10,000 to 60,000 hPa.

Dead spaces are taken to mean volume elements in the container which are not filled with siloxane composition, but are, for example, gas inclusions. In the context of the present invention, the expression "substantially free of dead space" shall also be taken to mean the presence of gas inclusions to a minor extent which cannot ever be completely excluded in industrial operation, wherein the proportion of volume elements of gas is preferably a maximum of 0.1% by volume, more preferably a maximum of 0.05% by volume, and in particular a maximum of 0.01% by volume, in each case based on the volume elements of the composition in the container.

Preferably, the lines used according to the invention are fabricated from high-alloy corrosion-resistant steels such as, for example, steel of material number 1.4301 or, most preferably, steel of the material number 1.4571 as specified in DIN 17007.

The volumetric flow rate of composition, preferably siloxane composition, into the container from which it is to be metered according to the invention, is preferably more than 200 liters per hour, more preferably 500 to 5000 liters per hour, and in particular 800 to 3000 liters per hour.

The container used according to the invention preferably has a volume of at least 250 liters, more preferably from 250 to 2000 liters, and in particular 500 to 1500 liters.

Preferably, no internal or external heating/cooling devices are arranged for the container. However, dynamic or static mixers or mixing elements can be arranged in the container, in order, for example, to mix in liquid or pasty substances. If such a mixing process is to be carried out, then the mixers or mixing elements are preferably arranged just upstream of the outlet opening.

The container is equipped with an intake opening and an outlet opening for the composition. There can be a pressure gradient between intake opening and outlet opening in the container, which is preferred. If, in the container, there is a pressure gradient between intake opening and outlet opening, this is preferably a maximum of 50,000 hPa, more preferably 2000 to 30,000 hPa, wherein the pressure at the intake opening is preferably greater than at the outlet opening. For calculating the compressed volume, the pressure is taken into account immediately upstream of the outlet opening.

In the method according to the invention, the container is operated in a temperature range from −20 to 150° C., preferably at 10 to 60° C.

In the method according to the invention, the mixtures that are preferably continuously prepared are fed continuously via closed pipe systems through an intake opening to the container used according to the invention, preferably using a transporting installation such as a gear pump.

For continuous replenishment of the container, however, the most varied reservoir containers such as tubs, fluid bags or tank containers may also be used.

Most preferably, the feed of the compositions is supported by the use of a storage device as is described in DE-A1-10 2007 002 379, which is incorporated in the disclosure of the present application by reference. This is because it is then ensured that there is always a sufficiently high admission pressure upstream of the transporting element in order to force the composition into the transporting element.

For transporting the composition into the container according to the invention, all known pressurizing units can be used such as, e.g., extruders or pumps. Preference is given to gear pumps.

The intake opening into the container is preferably circular. It preferably has a size (as maximum diameter) of a maximum of 200 cm, wherein a size from 3 to 50 cm is particularly preferred.

It is frequently expedient to install screens upstream of the transporting line such as, e.g., what are termed strainers. Relatively large filler particles or coarse impurities that may be present can thereby be removed from the material to be mixed.

The outlet opening is preferably a closure at the end of the container along the direction of the flow of the silicone composition such as, for example, a ball cock or a piston valve. This closure is preferably open for a short time under electronic control until the volume that is to be metered has been taken off from the container. The composition can in this case be metered directly into small packages. The volumes taken off, however, can also be pushed into the small packages provided such as tubes, cartridges or flexible pouches under the action of low pressures and shearing forces, for example by using a metering piston.

The volume that is to be metered in according to the invention corresponds to the amount to be packaged into the small package such as, e.g., 600 ml in what are termed flexible pouches, 310 ml in the case of PE cartridges, or 80 ml in the case of aluminum tubes.

An important characteristic of the method according to the invention is that the silicone composition is transported continuously into the container and in parallel thereto, is taken off discontinuously in discrete amounts.

There is a great advantage here in the continuous feed of the material, since a high mechanical load of what is termed a stop-and-go method is avoided.

The method according to the invention also has the advantage that it can be operated without interruption over relatively long periods, such as a plurality of hours or days, as a result of which the utilization of the packaging plants with respect to time is very high.

In addition, the method according to the invention has the advantage that premature product curing cannot occur in the container.

The method according to the invention has the advantage that compositions having a very short skin formation time can also be packaged.

The method according to the invention has the advantage that no staff are required in order to perform a change of the reservoir containers.

The method according to the invention has the advantage that it can be operated over a long period without interruptions.

The method according to the invention has the advantage that the compositions can be packaged without residues and wastes.

The method according to the invention has the advantage that no pressure pulses occur at the packaging plant.

The method according to the invention has the advantage that it can be operated with very low mechanical complexity.

In the examples hereinafter, all details of parts and percentages, unless stated otherwise, are based on the weight. Unless stated otherwise, the following examples are carried out at a pressure of the surrounding atmosphere, that is to say at about 1000 hPa, and at room temperature, that is to say about 20° C., or a temperature which is established on addition of the reactants at room temperature without additional heating or cooling. All viscosity data cited in the examples are based on a temperature of 25° C.

Example 1

In a continuously operating twin-screw extruder, 1200 liters/hour of a transparent, moisture-sensitive and firm RTV1 sealing compound having a density of 1.02 g/cm$^3$ which cures with the elimination of acetic acid, were prepared (mixture of 66.95% by weight of a polydimethylsiloxane which comprised diacetoxymethylsilyl end groups and diacetoxyvinylsilyl end groups in the ratio 1:2, having a viscosity of 80,000 mPas, 22.0% by weight of an a,ω-bis-trimethylsiloxypolydimethylsiloxane having a viscosity of 1000 mPas, 4.5% by weight of a mixture of acetoxysilanes, 0.05% by weight of a mixture of 20% by weight of dibutyltin diacetate and 80% by weight of organic plasticizer and also 6.5% by weight of a pyrogenic silicic acid having a BET surface area of 150 m$^2$/g). The RTV1 sealing compound was then continuously degassed, cooled to approximately 40° C. and forced using a gear pump through a closed pipe system from the bottom via the bottom opening into an empty storage device having a maximum capacity of 900 liters.

This storage device was at a permanent pressure of approximately 9000 hPa, which was sufficient as an admission pressure in order to feed the sealing compound via a further pipe to a gear pump arranged only a few meters downstream of the storage container. Using this gear pump, the RTV1 sealing compound was forced into a cylindrical container at a pressure of 25,000 hPa through a round intake opening of 8.4 cm diameter. At the outlet opening of this container, a pressure of 12,000 hPa and a temperature of 37° C. were measured.

The container out of which the metering is performed according to the invention, is a pipe having a length of 65 meters and an internal diameter of 16.0 cm. The pipe in this case was bent owing to structural circumstances 6 times (pipe bends made of welded pipe as specified in DIN 17457, material 1.4571, model 10). The wall of the container consisted of 4 mm thick stainless steel (material 1.4571, construction as specified in DIN EN 10217). The container was closed with a valve as the outlet opening, the open cross section of which was 20 cm$^2$.

From the foregoing dimensions, a volume of the container of 1.311 m$^3$ is calculated which, at the applied pressure at the start of the line of 25,000 hPa and of 12,000 hPa at the end of the line is considered to be of constant volume.

The adiabatic compressibility coefficient of the sealing compound used was $0.90 \cdot 10^{-9}$ m$^2$/N at 37° C. and 12,000 hPa.

A mathematical product of effective volume, adiabatic compressibility coefficient and pressure at the outlet opening of 1.41 liters is given thereby.

With each metering step, 310 ml of the RTV1 sealing compound were taken off. The calculated volume of 1.41 liters as a mathematical product of adiabatic compressibility coefficient of the transported RTV1 sealing compound, the pressure prevailing in the container at the outlet opening and the volume of the container is therefore greater than the volume of RTV1 sealing compound taken off in the individual metering step.

The volume of 310 ml taken off was pushed into a polyethylene cartridge in a cartridge packaging plant using a metering piston. The use of what is termed a twin-head machine in this case enabled a very high packaging performance.

Each individual volumetrically controlled metering operation lasted 0.5 seconds. Then the container remained closed for 0.5 seconds at the outlet.

The capacity of the packaging plant was therefore 28,800 cartridges per 8 hours.

During the entire 8 hours, 18.6 liters of new material were fed continuously per minute to the container under the operating conditions.

The plant was operated over a plurality of hours without faults. No pressure pulses were observed.

Example 2

Example 1 was repeated under the same conditions with the change that an RTV1 sealing compound of the following composition was used (density: 0.98 g/cm$^3$): mixture of 65.6% by weight of a polydimethylsiloxane which comprised diacetoxymethylsilyl end groups and diacetoxyvinylsilyl end groups in the ratio 1:2, having a viscosity of 80 000 mPas, 23.8% by weight of a hydrocarbon mixture having a kinematic viscosity of 6.2 mm$^2$/s at 40° C., a viscosity-density constant of 0.79 and a boiling range from 300 to 370° C., 2.8% by weight of a mixture of acetoxysilanes, 0.05% by weight of a mixture of 20% by weight dibutyltin diacetate and 80% by weight organic plasticizer and also 7.5% by weight of a pyrogenic silicic acid having a BET surface area of 150 m$^2$/g and 0.25% by weight of a polyalkylene glycol having a molar mass of approximately 600 g.

The adiabatic compressibility coefficient of the composition used was $0.89 \cdot 10^{-9}$ m$^2$/N at 37° C. and 12,000 hPa. This gives a mathematical product of effective volume of the container, adiabatic compressibility coefficient and pressure at the outlet opening of 1.39 liters, which again is greater than the volume of 0.31 liters taken off in each case.

The invention claimed is:

1. A method for metering compositions comprising organosilicon compounds from a container which is substantially free of dead space and stable in volume and from which the composition is taken off discontinuously in discrete volumes, comprising establishing, before a metering step, a calculated volume to be greater than the volume of composition taken off in the metering step, the calculated volume being the mathematical product of the adiabatic compressibility coefficient of the composition, the pressure prevailing in the container at the outlet, and the volume of the container.

2. The method of claim 1, wherein the compositions are crosslinkable compositions comprising organosiloxanes.

3. The method of claim 2, wherein the compositions contain organosiloxanes in amounts of 50 to 99% by weight.

4. The method of claim 1, wherein the compositions are highly viscous compositions having viscosities of greater than 10 Pa·s, measured at 25° C. and a shear rate of 1.0 s$^{-1}$.

5. The method of claim 2, wherein the compositions are highly viscous compositions having viscosities of greater than 10 Pa·s, measured at 25° C. and a shear rate of 1.0 s$^{-1}$.

6. The method of claim 3, wherein the compositions are highly viscous compositions having viscosities of greater than 10 Pa·s, measured at 25° C. and a shear rate of 1.0 s$^{-1}$.

7. The method of claim 1, wherein the container is a pipe.

8. The method of claim 3, wherein the container is a pipe.

9. The method of claim 1, wherein the container has a volume of at least 250 liters.

10. The method of claim 3, wherein the container has a volume of at least 250 liters.

11. The method of claim 7, wherein the container has a volume of at least 250 liters.

12. The method of claim 1, wherein the internal pressure of the container that is substantially free of dead space is maintained at at least 5000 hPa.

13. The method of claim 3, wherein the internal pressure of the container that is substantially free of dead space is maintained at at least 5000 hPa.

14. The method of claim 7, wherein the internal pressure of the container that is substantially free of dead space is maintained at at least 5000 hPa.

15. The method of claim 9, wherein the internal pressure of the container that is substantially free of dead space is maintained at at least 5000 hPa.

* * * * *